US007212885B2

(12) United States Patent
Diaz et al.

(10) Patent No.: US 7,212,885 B2
(45) Date of Patent: May 1, 2007

(54) SYSTEM FOR SELECTING AND RETRIEVING SHOES FROM AN AUTOMATED SHOE RACK

(76) Inventors: Rafael J Diaz, 19629 Crystal Rock Dr., Apt 14, Germantown, MD (US) 20874; Celestine D. Diaz, 1310 Blair La., Hoffman Estates, IL (US) 60194

( * ) Notice: Subject to any disclaimer, the term of this patent is extended or adjusted under 35 U.S.C. 154(b) by 365 days.

(21) Appl. No.: 10/919,706

(22) Filed: Aug. 17, 2004

(65) Prior Publication Data

US 2005/0067420 A1 Mar. 31, 2005

Related U.S. Application Data

(60) Provisional application No. 60/481,300, filed on Aug. 27, 2003.

(51) Int. Cl.
*G06F 17/00* (2006.01)

(52) U.S. Cl. ...................... 700/242; 700/214; 700/244; 345/630

(58) Field of Classification Search ................ 700/242, 700/244, 213, 214; 235/385; 345/630
See application file for complete search history.

(56) References Cited

U.S. PATENT DOCUMENTS 5,969,720 A * 10/1999 Lisle et al. ................. 715/775
6,147,686 A * 11/2000 Brown et al. ............... 715/839
6,738,687 B2 * 5/2004 Hanel ......................... 700/214
2002/0121980 A1 * 9/2002 Wan et al. ............... 340/572.1
2002/0140732 A1 * 10/2002 Tveskov ..................... 345/763
2004/0133483 A1 * 7/2004 Potter et al. .................. 705/28
2005/0177463 A1 * 8/2005 Crutchfield et al. .......... 705/27
2006/0005071 A1 * 1/2006 Fu ............................... 714/5

* cited by examiner

*Primary Examiner*—Khoi H. Tran

(57) ABSTRACT

Shoe organization and selection system whereby a person can easily and conveniently find a pair of shoes desired from their closet by selecting the shoe from a computer screen that contains pictures of all of the shoes in the shoe organizer (FIG. 1A), and then the computer will open the appropriate shoe drawer (18) so that the desired shoe can be extracted. The system comprises of a modular shoe organizer rack (FIG. 1A) which will contain the actual shoes, a motorized shoe drawer (18), and a shoe selection console (40), thereby named SSC for short, that will be directly connected to each shoe compartment either wired or wirelessly. The shoe selection console (40) will contain a picture of each shoe (42) contained in the shoe organizer. The pictures will either be a hard copy picture of the shoe which can be slid into the each individual SSC cell (42) (in the case of a push button type console) or it will be an appropriate computer generated picture stored in each cell that will be shown graphically on the SSC. The device is operated as follows. A person wants to grab a pair of red pumps from her closet as quickly as possible. She goes to the SSC and finds the cell containing the picture of the shoe desired. She then selects that shoe by pressing or touching the corresponding cell on the screen. The SSC will then send a signal to the shoe organizer unit (FIG. 1A) to the appropriate shoe compartment (18) programmed for that shoe. It will then activate the motor (50) that will open the shoe compartment (18) and slide the shoe drawer out. The person can now extract the shoes from the compartment. After she extracts the shoes, she taps the extended drawer (18) by pushing it in a little and the reversible motor (50) will automatically slide the drawer back into the shoe organizer.

14 Claims, 5 Drawing Sheets

Front View
Fig. 1-A
10
12
14
16
Shoe inside box
Side View
Retractable
Ball Bearings
Ball Bearing Rail
Fig. 1-C
Shoe Box Drawer
18
20
Ball Bearings
Top View
Fig. 1-B
Spring
26
22
14
24

*Fig 3 – Shoe Selector Computer*

*Fig 4 – Complete Picture Shoe Organizer System*

Front View

Top View – Spacer Bar only

Fig. 5C – Solenoid assembly attached to stop release shown in extended position

SYSTEM FOR SELECTING AND RETRIEVING SHOES FROM AN AUTOMATED SHOE RACK

CROSS-REFERENCE TO RELATED APPLICATIONS

Reference To Provisional Application:

This application claim the benefit of PPA Ser. No 60/481,300 filed Aug. 27, 2003 by the present inventors.

FEDERALLY SPONSORED RESEARCH

SEQUENCE LISTING OR PROGRAM

BACKGROUND OF THE INVENTION

1. Field of Invention

This invention relates generally to an electro-mechanical device controlled electronically by means of a computer or push button console that is used for accessing shoes stored in a shoe organizer.

2. Background of the Invention

In today's fast moving environment where fast food restaurants are the way of life, people would like to be able to accomplish things in as fast and as efficient as possible to get where they have to go. One of the things people have to do on an everyday basis is to put their clothes on after getting up from bed. As a part of that routine, finding the right shoe for the right outfit to wear for that day or to wear for a special event, or a dinner engagement could be a rather trying experience when you're running late and need to get ready quickly. A typical problem is that you have quite a few shoes that may or may not be well organized into shoe racks in your closet. Even if they are organized in shoe racks, it often takes some time for you to bend down and look through all of the array of shoes you have to find just that right pair to match your outfit for that day or event you are about to be late attending. Some other problems that exists today even with the current shoe organizers that are in the market is that you have to take the time to either pull the shoe out of a shoe compartment so that you can see the shoe itself or for those types of racks that you lay the shoe on top of, you have to pick up the shoe from the rack. An additional disadvantage is that when someone is in a hurry and you have a choice of several similar shoes for a particular outfit, it would take you longer to look for the right shoes since you would have to manually search all of your shoes to pull out the similar shoes.

OBJECTS AND ADVANTAGES

Accordingly, several objects and advantages of this invention are:

(a) to provide an easy and quick way for a person to find the desired shoe by using a separately and conveniently mounted console that will contain pictures of all of the shoes stored in the shoe organizer within your closet.

(b) to provide a means to select the desired shoe by simply pressing the appropriate picture of the desired shoe on the console (c) to provide a means whereby the console automatically opens up the shoe compartment that contains the selected shoe.

(d) to provide a means whereby the person can now quickly walk up to the extended shoe compartment and remove the pair of shoes without having to had looked for it as described in the prior art description.

(e) to provide a easy and flexible way to do multiple selections of shoes based on any matching criteria one desires for the purpose of facilitating matching up the right shoe to the right outfit.

Further objects and advantages are to provide a complete shoe organizational system that allows for someone to not only quickly find the desired shoe quickly and effortlessly, but it also allows one not to have to continuously bend over inside of the closet looking for the desired shoe, which can quickly tire someone out if done on a constant and continual basis. Further objects and advantages will become evident in the ensuing description and drawings.

SUMMARY

In summary, this invention describes a shoe organization and selection/retrieval system that allows a person that has a large number of shoes to quickly select the desired shoes or series of shoes by means of a shoe selection console, and then having the console automatically send a signal to the shoe organizer compartment(s) corresponding to the selected shoe(s), which in turn, extends the shoe compartment drawer of the desired shoe for easy extraction of the shoe(s). The shoe compartments can then be retracted back to its fully retracted position by the simple push of the opened shoe compartment drawer.

DRAWINGS—FIGURES

In the drawings, closely related figures have the same number but different alphabetic suffixes.

FIG. 5A–5C shows a front and top view of the shoe organizer unit showing only the detail front and backstop solenoid releases as well as a detailed view of the solenoid itself (FIG. 5C).

Figure 1:
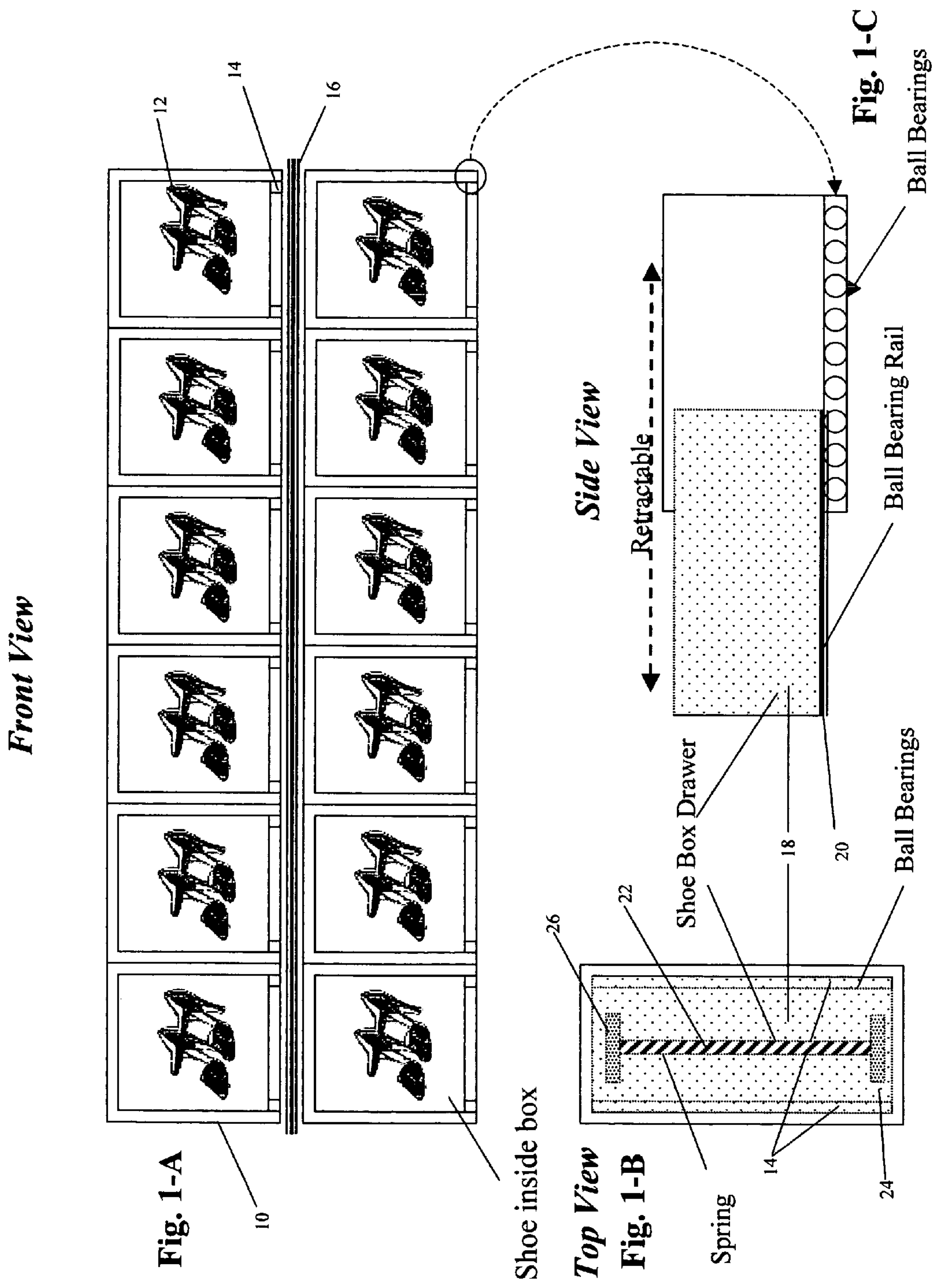
FIGS. 1A to 1C show a front, top, and side view of the shoe organizer compartment portion of the system using a ball bearing system for the shoe drawer movement.

| DRAWINGS - Reference Numbers |
|---|
| 10 - External housing of the shoe organizer unit |
| 12 - shoe contained inside of shoe compartment |
| 14 - Ball bearings |
| 16 - Shoe organizer unit row separator/spacer bar |
| 18 - shoe compartment drawer |
| 20 - Ball bearing rail |
| 22 - Spring |
| 24 - Front Stop |
| 26 - Backstop |
| 30 - Shoe compartment drawer footing |
| 32 - Front stop release |
| 34 - Backstop release |
| 36 - Retractable stop release solenoid |

-continued

| DRAWINGS - Reference Numbers |
|---|
| 40 - Shoe selector computer |
| 42 - Picture of shoe in cell |
| 44 - data translator unit |
| 46 - Connector wire/wireless connection |
| 50 - Reversible gear motor |
| 52 - Gear teeth rail |
| 54 - Gear assembly |

DETAILED DESCRIPTION—FIGS. 1A, 1B, 1C, 2, 3, 4, 5—PREFERRED EMBODIMENT

One embodiment of the shoe selector system is illustrated in FIG. 1A (front view), FIG. 1B (top view), and FIG. 1C (side view). FIG. 1A shows an embodiment of the shoe organizer compartment unit that uses ball bearings 4 as its transport mechanism for the sliding drawers. The shoe organizer compartment unit is a modular unit that can be easily expanded to hold more or less compartments. FIG. 1A shows a 12-unit compartment. The compartments are stackable and can also be added horizontally to add more compartments. The outside housing 10 can be made of plastic or wood. The compartment drawer 12 is made of the same material as the housing 10 and can contain a photograph of the shoe contained within the drawer if so desired. FIG. 1A shoes a picture of the shoe contained within for illustration purposes only. The ball bearings 14 is used to help the compartment drawer 12 slide in and out easily. The spacer bar 16 is used as a separator between each horizontal row and allows for stacking the compartment units as well as contains the release mechanisms for the front stop 24 and backstop 26.

FIG. 1B shows a top view of one of the compartment drawers 12 in its retracted position. The spring 22, shown as a hidden component, is actually attached beneath the compartment drawer 12 to the front stop piece 24 and the backstop piece 26. The front stop 24 and the backstop 26 pieces are attached directly to the bottom of the compartment drawer 12. Attached to the bottom of the spacer bar 16 are two retractable stop release bars. The front stop release bar 32 is used to prevent the compartment drawer 12 from falling out from the organizer unit as well releasing the drawer to allow it to slide outward from the shoe organizer unit. The backstop release 34 is used to prevent the compartment drawer 12 from hitting the back of the shoe organizer unit as well as releasing the drawer to allow it to slide forward. The stop release solenoid 36 with a retractable pin is attached to each of the stop releases.

Figure 3:
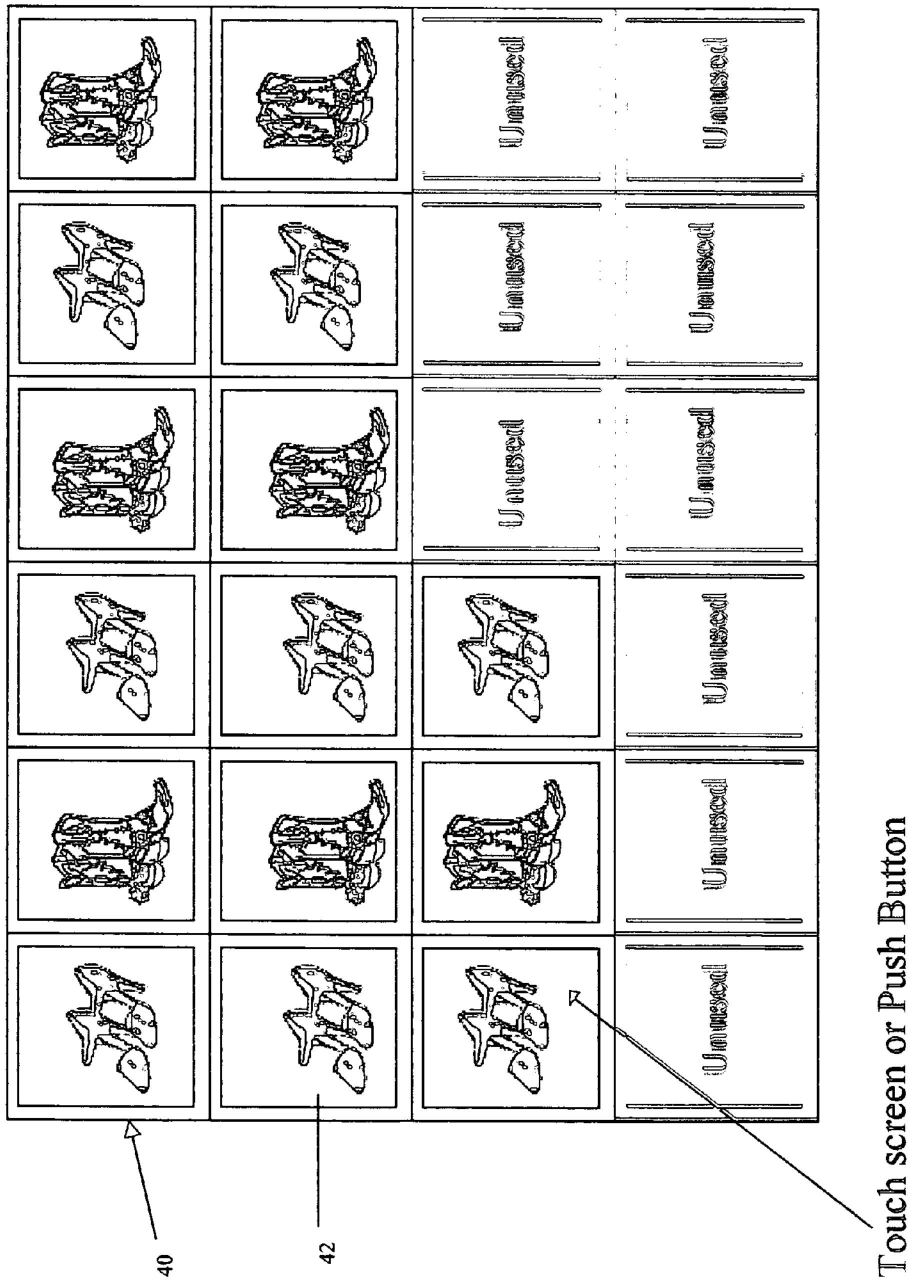
FIG. 3 shows a front view of the shoe selection console with examples of the picture of the shoes attached to various cells.

FIG. 3 shows the shoe selector computer unit that is used to select the desired shoe from the shoe organizer unit. A picture of each shoe is stored within the computer's memory and shown in each cell 40 that corresponds to each shoe compartment drawer 12. The computer screen can be a touch screen display so that when the user wants to select a shoe, the person simply touches the picture of the shoe and the computer sends an electrical signal to the appropriate shoe compartment drawer 12 containing the desired shoe. Alternatively, it can be a point and click selection using a computer mouse.

The connection between the computer and the shoe organizer unit itself is via a simple pair of twisted wires 46. In a higher model version of this invention, one can envision this connection being a wireless connection 46. In either case, the communication between the computer and the shoe organizer unit and its drawer compartments will be via a computer bus using a very simple bus protocol. This is done because each compartment drawer will be software addressable vs. having physical connections to each and every drawer in the organizer. This will require a small microprocessor controlled digital circuit board on the organizer itself, which is shown in FIG. 4C as the data translator board 44, and a wire bus that will connect to each drawer unit. Alternatively, a circuit board back plane can also be used, by attaching the back plane to the rear of the organizer unit. The shoe selector computer 40 has a digital "address" associated with each shoe drawer unit that is established when the user initially enters in the pictures and assigns them to each cell as described previously. When the user goes to select a shoe by touching the desired picture on the touch screen, the computer addresses the corresponding shoe compartment drawer's circuit connection by sending the address to the data translator board 44. The data translator board will then convert the data address and activate the proper connection to the correct shoe compartment drawer 12 by sending an electrical signal to the solenoid or gear motor to open that drawer.

Figure 4:
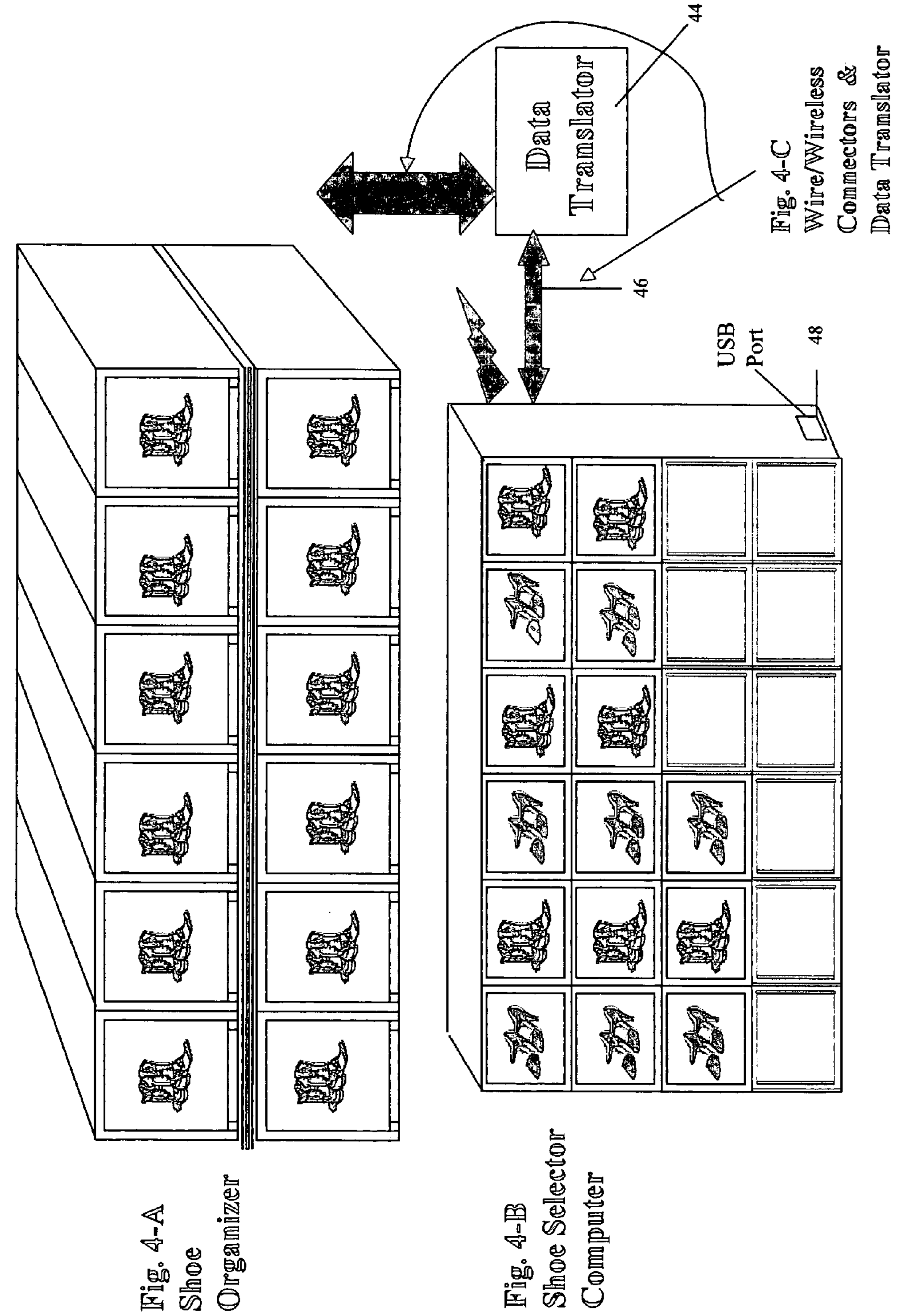
FIG. 4A to 4C show the complete systems with the shoe organizer compartment unit along with the shoe selection console and the connection of the two units via the means of wired or wireless connection.
Figures 5, 5A, 5B:
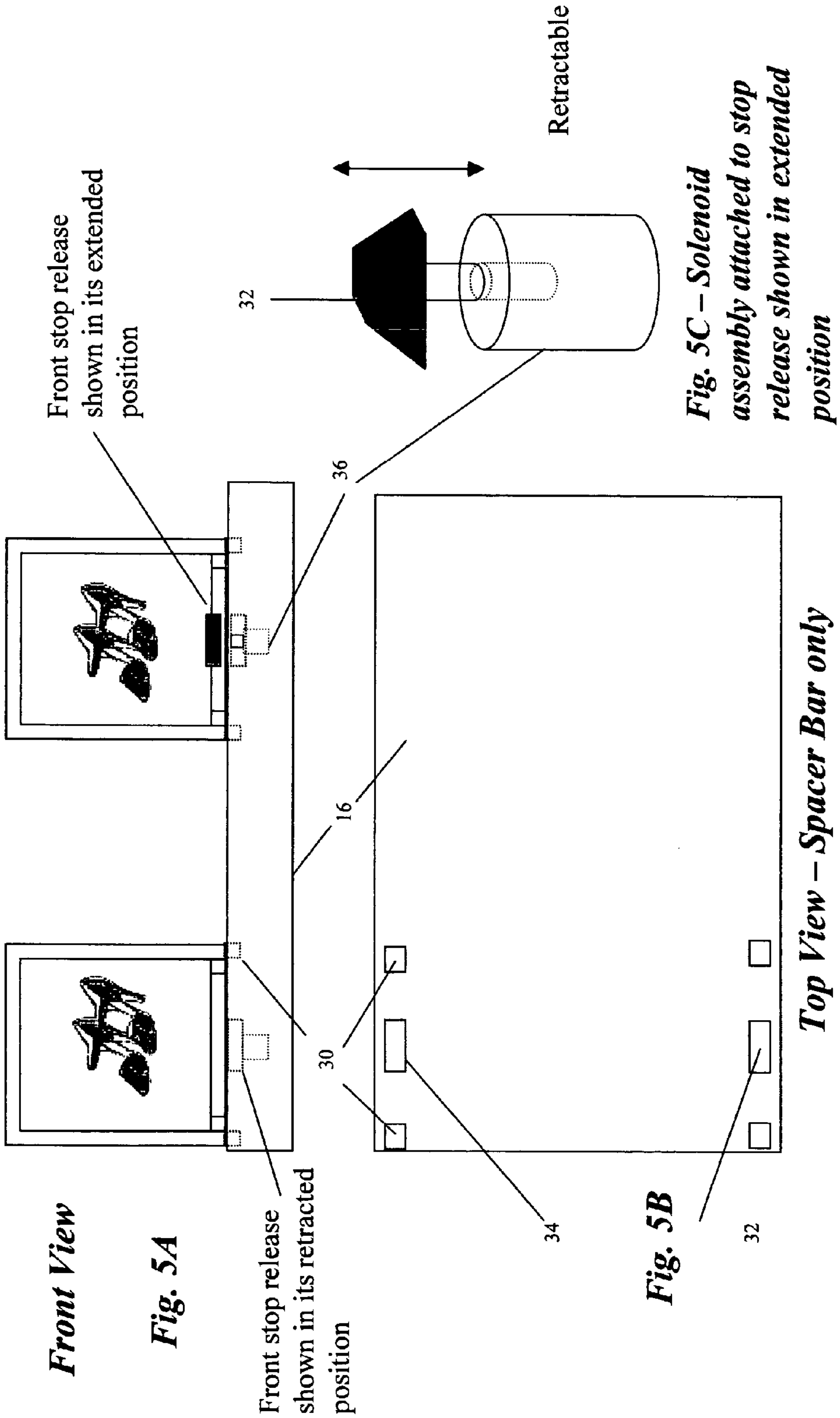

FIG. 4 shows the complete picture shoe organizer system. FIG. 4A shows the shoe organizer unit itself. FIG. 4B shows the shoe selector computer that has a touch screen display. The touch screen display is showing an example of a few shoes that are currently in the shoe organizer along with several "empty" cells where there are currently no shoes occupying those spaces in the shoe organizer. FIG. 4C shows a depiction of the data translator board that will be physically connected to the rear of the shoe organizer unit and the wired or wireless connection between the shoe selector computer and the shoe organizer unit.

Operation—FIG. 1, 3

One embodiment of the shoe selector system works as follows using ball bearings as the transport mechanism for the drawers. FIG. 1B shows the spring 22 in its fully extended position. That is, the maximum amount of spring tension is being applied to the spring 22. The compartment drawer 12 is being held in its closed position by the front and backstops 24 and 26. When a person wants to select a shoe they want to wear or look at, the person will scan the shoe selector console's screen (shown in FIG. 3) to find the picture of the shoe desired. Once the desired shoe is found, the user presses, clicks on, or touches the picture of the shoe on the screen. The shoe selector computer will then send an electrical signal to the appropriate shoe compartment drawer 12 containing the matching shoes via the translator board 44. The electrical signal will trigger the stop release solenoid 36 connected to both stop releases. The solenoid connected to the backstop release 34 will retract the stop release by pulling it down to clear the backstop attached underneath the compartment drawer 12. Simultaneously, the solenoid connected to the front stop release 32 will also retract the front stop release by pulling it down to clear the front stop connected underneath the compartment drawer.

The spring 22 will then push the compartment drawer 12 outward. Once the front and backstops 24 and 26 clears the stop releases, the solenoid 36 automatically reverses polarity and pushes the stop releases back into its extended position. As the spring 22 continues to push the compartment drawer outward, using the ball bearings 14 to slide on, the compartment drawer will stop once the backstop 26 reaches the now extended front stop release 32. At this point, the compartment drawer is fully extended and the shoes inside the compartment are assessable to the user.

Once the user is done with either viewing the shoes or removing the shoes, the user pushes the compartment drawer back into its fully retracted or closed position. Since the stop releases are spring loaded and beveled at the front, the compartment drawer's front and backstops 24 and 26 will push down the stop releases on its way back. As soon as the front and backstops clear the stop releases, the spring loaded stop releases will extend again to its extended position and hold the compartment drawer in place. The spring 22 is now again in its fully extended position.

Figure 2:
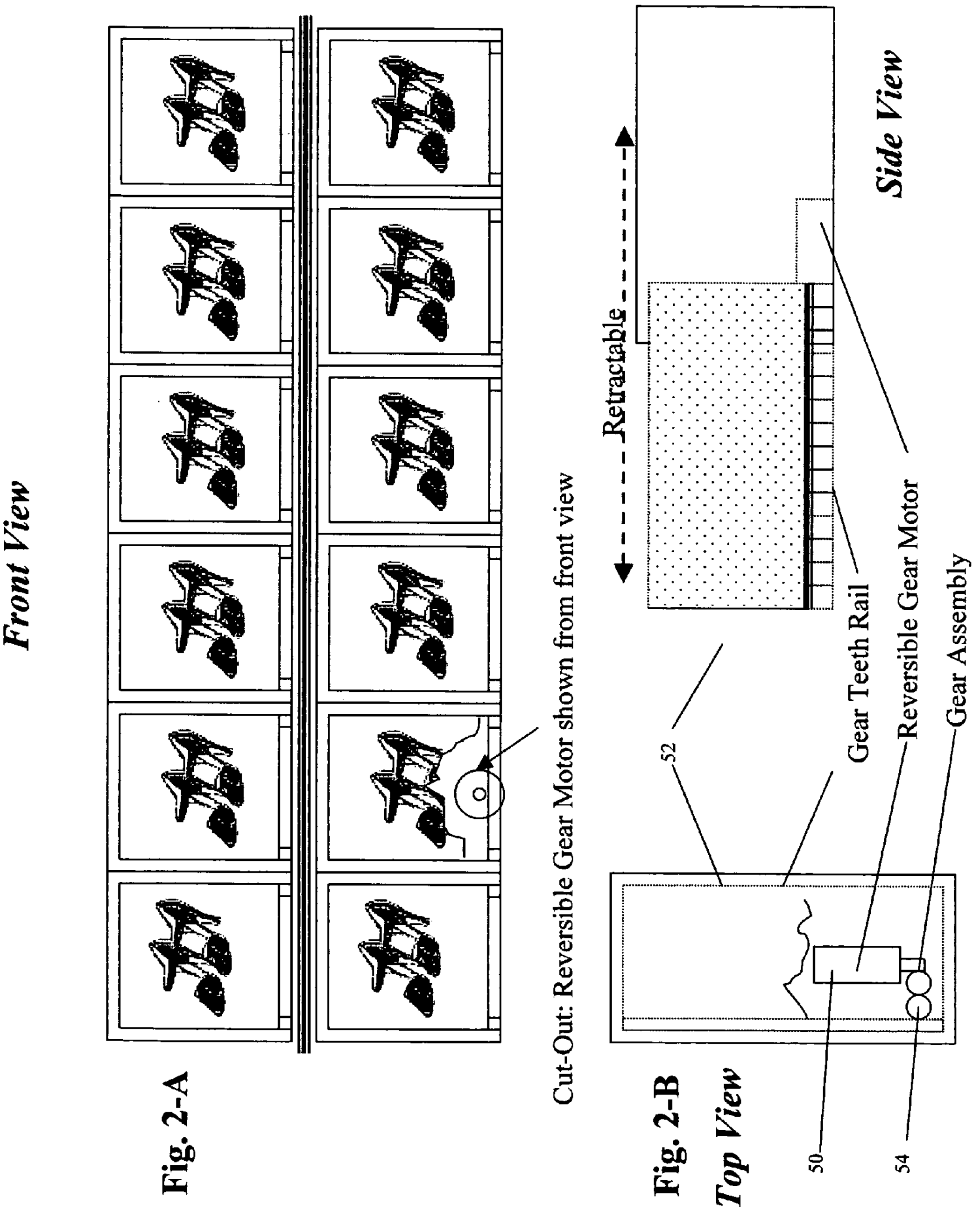
FIGS. 2A to 2C show a front, top, and side view of the shoe organizer compartment portion of the system using a rack and pinion type assembly for the shoe drawer movement.

Alternative Embodiments—the Preferred Embodiment, FIGS. 2, 3, 4

Another preferred embodiment of the shoe selector system is illustrated in FIG. 2A (front view), FIG. 2B (top view), and FIG. 2C (side view). FIG. 2 represents another method for extending and retracting the shoe compartment drawers 12. This preferred method could be considered as the high end model due to its more sophisticated operation and ease of use (and high cost). The only difference between the operation of compartment drawer 12 shown in FIG. 1 and the one shown in FIG. 2 is the method of how the drawer is extended and retracted. In FIG. 2A, one of the shoe compartment drawers 12 is shown with a cutout of the reversible gear motor 50 that is attached beneath each of the shoe compartment drawers from the front view.

In FIG. 2B, a top view is shown that provides a cutout picture of the reversible gear motor 50 and the gear assembly 54. The gear teeth rail 52 is attached to the shoe compartment drawer on left side along the bottom of the drawer. Whether the rail manufactured on the left side or right side is irrelevant in this invention.

Operation—FIGS. 2, 3, 4

The shoe selector computer operates as follows for both embodiments of the invention described above. The user enters the pictures of the shoes that will be stored in the shoe organizer into the computer 40 via the means of a digital camera interface 48 (Universal Serial Bus (USB) port) and a simple graphical user interface via the touch screen. The user first enters a setup screen found on the main computer screen menu. The computer then sets up the digital camera interface so that the pictures can be downloaded from the camera. The computer then prompts the user for each picture and asks the user which computer cell 42 that the user wishes to store the picture in. Ideally, the cell should correspond to the same or similar location in the shoe organizer itself in terms of row and column location. The cells will be numbered for ease of identification and organizing the pictures. Once the pictures are all entered in the computer is now ready for operation.

The operation of the gear-based shoe compartment drawer works as follows. The user goes to select the shoe desired from the shoe selector computer 40 shown in FIG. 3 by touching or pressing the picture of the shoe located in the cell 42. The computer will send message containing the "address" of the shoe compartment containing the selected shoe to the data translator board 44 attached the rear of the shoe organizer unit. The data translator board will convert the message and send a signal to the appropriate shoe compartment drawer 12 that contains the selected shoe. The signal will activate the reversible gear motor shown n FIG. 2B—which is shown in its retracted or closed position. The gear motor will begin to turn the gear assembly 54 so that the gear meshed against the gear teeth 52 rotates in a counter-clockwise direction. This will in turn, begin to extend the shoe compartment drawer 12 outward as the gear continues to turn. The motor will continue to turn for a pre-determined time until the cabinet drawer is at its fully extended or opened position. The pre-determined time is calculated based on the distance required to move the drawer to its fully opened position. Once the position has been reached, the motor will be turned off. There will be no need for backstops or stop releases in this embodiment of the invention although invention does not preclude the use of front stop and backstop switches as a backup in case the timing from the computer to activate the motor goes out of sync over-time. The switches will prevent impending damage to the motor and drawer units if this problem ever occurs. If this occurs, the shoe selector computer can automatically re-adjust the timing based on the time the front and/or backstop switches were activated.

At this point, the shoe compartment s now fully extended. The user can extract the shoes from the open compartment. Once the user is done with this tasks, the user then simply touches the front of the shoe compartment drawer 12 and gently pushes the drawer in. A micro-switch located at the front of the shoe compartment opening will sense that the drawer was pushed in and it will cause the reversible gear motor 50 to reverse polarity and turn on the motor. The motor will then turn the gear that is meshed against the gear teeth in a clockwise direction in order to cause the drawer to now be pulled back in or closed. The operation of closing the drawer can be equated to closing a CD tray on a computer or a CD audio player device. One only needs to slightly push the drawer in which allows the motor inside of the device to close the CD tray itself.

Conclusions, Ramifications, and Scope

Thus the reader can see that this automated shoe selector and shoe organization system is a very convenient, easy to use, and highly flexible system that allows one who own many shoes to quickly select a pair or pairs of shoes without having to bend over in a closet and search through all of the shoes to find the desired shoes. By the use of technology, this system allows one to quickly scan through their entire inventory of shoes by means of looking at a picture of the shoe on a touch screen that can be mounted separately from the shoe organizer unit itself for easy access. One can then simply touch the picture of the shoe desired on the touch screen and immediately, the shoe drawer compartment containing that shoe will open so that the person can walk into the closet and just grab the shoes.

While the above description contains many specificities, these should not be construed as limitations on the scope of the invention, but rather as an exemplification of one preferred embodiment thereof. Many other variations are possible. For example, the following are just a few variations possible:

In addition to the compartment drawer transport mechanism being a rack and pinion assembly and a spring loaded ball bearing assembly, other transport mechanisms are possible. One can envision a belt driven transport mechanism for the drawer unit or a piston driven transport mechanism as well.

The shoe organizer unit's physical construction can be of any lightweight material that is easily manufactured and durable.

The drawer compartments themselves can be made of a translucent or see-through material to allow for the ser to actually see the shoes while the drawer is in its closed position. Since the shoes are usually stacked on top of each other or space efficiency, it may be hard to see the shoes while inside of the drawer unit so each compartment may also have a small light so that the shoes may be seen more easily.

The computer software can be programmed to automatically re-configure itself whenever the user wants to add additional shoe compartments to the existing shoe organizer unit by automatically detecting when the additional compartments are stacked on and then showing the new compartments on the touch screen of the shoe selector computer.

The data translator unit can be any type of CPU (Computer Processing Unit) based component that is capable of handling any type of data protocol to convert the shoe compartment address into an electrical signal directed to the addressed shoe compartment. This can be a USB bus, 802.11 wireless connection, IEEE bus protocol, etc.

The shoe selector computer can be any type of CPU based component that does not necessarily have to have a touch screen pad interface. It can be a standard keyboard interface with a standard computer monitor or it can be a PDA device interface such as a Palm Pilot, cell phone, or equivalent device that has a display that can show pictures of the shoes contained in the shoe organizer unit. It may also be a simple mechanical push button type device with a photograph of each shoe inserted or pasted on each button and connected to the shoe organizer unit. In addition, it may also be a voice command operated interface for visually impaired people. The use of Braille can be used for identifying the shoe characteristics for visually impaired people.

The shoe organizer system can also have a feedback mechanism that will detect when a drawer has not been closed (in the case where the person was in a hurry and forgets to close the drawer) and sounds an audible and/or visual alarm that a compartment has been left opened. It can then automatically close the drawer unit itself after a certain programmable timeout period.

The shoe organizer system can also allow for the user to select multiple shoes at one time base on the matching criteria that the user enters. For example, the user may want to look at all red shoes that will match the red dress that she wants to wear. The shoe selector computer will then open the drawers of all red colored shoes all at once.

In yet another variable of the above multiple shoe selection feature, the computer can also make shoe selection suggestions for the user based on the type of dress or suit that the user will wear (including color, texture, etc.) and the shoe selector computer will match up the best shoes for that outfit and open the drawers for all matching shoes fitting that criteria.

In addition to the two aforementioned multiple shoe selection feature, the computer can also remember all previously elected combinations of outfits and shoes and establish a user preference model so tat the next time the user wants to match an outfit type with a shoe type, the computer can make suggestions based on historical data and the user's preference.

Accordingly, the scope of the invention should be determined not by the embodiment(s) illustrated, but by the appended claims and their legal equivalents.

The invention claimed is:

1. A shoe selection device combined with a shoe organizer unit which allows for quickly and easily selecting one or more pairs of shoes from said shoe organizer unit and having said shoes presented to you for easy retrieval, comprising:

a. a shoe selection device used to display the pictures of the shoes contained in the shoe organizer compartments, b. a means by which a human operator can store or paste a picture of the shoes on or in the shoe selection device, c. a means by which the shoe selection device communicates to the shoe organizer unit to select the shoe compartment drawer of the selected shoe, d. a means by which the shoe organizer unit can extend out the desired shoe that was selected via the shoe selection device, e. a means by which the shoe compartment drawer can retract back to its closed or retracted position once the human operator has initiated the closing of the previously mentioned shoe compartment drawer or by an automated means by a predetermined timeout period whereby the said shoe compartment drawer closes by itself, whereby a human can easily select from a potentially large number of shoes stored within said shoe organization unit from the convenient location of said shoe selection device where said shoe selection device conveniently displays a picture of all said shoes on or in said shoe selector device, and whereby said selector device will communicate to said shoe organizer unit the desired shoe(s) selected by the human operator by means of either physically touching said picture(s) of shoe(s) or verbally issuing commands selecting said shoe(s) desired, and extending said shoe compartment(s) of the selected shoe(s), whereby said shoe compartment drawer retracts to its closed position either by the human operator closing said drawer or by the said drawer closing automatically after a predetermine timeout period.

2. The shoe selection device of claim 1 further comprising of;

a. a display unit which contains the pictures of each shoe contained within said shoe unit organizer and displayed on a small computer screen size device, preferable shown in virtual cells displayed in a grid-like manner, b. means for selecting the desired shoe(s) by means of the human either physically touching said cell(s) containing the picture of the desired shoe(s) or by the human voicing predetermined commands indicating the desired shoe(s), c. a display unit which comprises of a touch screen display or push button display containing said picture of shoes, d. means of inputting the appropriate picture of said shoes contained within said shoe organizer unit into the desired cell location within said shoe selection device, e. means of optionally inputting the appropriate shoe characteristics of said shoes contained within said shoe organizer.

3. The shoe selection device of claim 1 wherein the said shoe selection device communicates to said shoe organizer unit for presenting the desired shoe(s) through a plurality of data transmission methods such as but not limited to;

a. a wired data transmission protocol through one or more wires, b. a direct wire method where each individual shoe compartment in said shoe organizer unit is directly connected to said cells within said shoe selector device, c. a wireless data transmission protocol whereby the "address" of each shoe compartment within said shoe organizer unit is communicated by said shoe selector device to open and close the selected shoe compartment drawer.

4. The shoe organizer unit of claim 1 wherein the transport mechanism for extending and retracting the shoe compartment drawer comprises of a combination of devices such as a ball bearing and rail combination or a rack and pinion combination.

5. The shoe organizer unit of claim 1 wherein the mechanism for physically moving the said shoe compartment drawer comprises of a combination of devices providing a means for retracting and extending said shoe compartment drawer through the use of a reversible motor or a spring loaded compartment drawer activated electrically by said shoe selection device.

6. The shoe organizer unit of claim 1 further including a device whose purpose is to receive the transmission from the said shoe selection unit regarding the electrical representation of the selected shoe's "address" associated with the compartment drawer(s) and convert said electrical representation(s) into a physical electrical signal(s) directed to desired compartment drawer(s) containing the selected shoe(s).

7. The shoe organizer unit of claim 1 further including a means for detecting when said shoe compartment drawer is in its opened position and retracts said opened drawer either via an automatic means through a predetermined timer or through the detection of the human pushing the drawer close through the use of a detection device capable detecting the inward motion of said drawer.

8. A shoe retrieval system which allows for quickly and easily selecting one or more pairs of shoes using a computer processor equipped shoe selection device and shoe organizer unit comprising:

a. said computer processor equipped shoe selection device containing a standard size computer screen used to display the pictures of the shoes contained in the shoe organizer compartments, b. a means by which a human operator can store or paste a picture of the shoes on or in the shoe selection device by means of transferring a picture(s) from a properly equipped camera to said computer processor equipped shoe selection device, c. a means by which said computer processor equipped shoe selection device communicates to said shoe organizer unit to select the shoe compartment drawer of the selected shoe, d. a means by which said shoe organizer unit can extend out the desired shoe that was selected via said computer processor equipped shoe selection device, e. a means by which the shoe compartment drawer can retract back to its closed or retracted position once the human operator has initiated the closing of the previously mentioned shoe compartment drawer or by an automated means by a predetermined timeout period whereby the said shoe compartment drawer closes by itself, whereby a human can easily select from a potentially large number of shoes stored within said shoe organization unit from the convenient location of said shoe selection device where said shoe selection device conveniently displays a picture of all aid shoes on or in said shoe selector device and prevents the human from having to physically bend down and pull out or look into every shoe compartment drawer within the closet, and whereby said computer processor equipped shoe selector device will communicate to said shoe organizer unit the desired shoe(s) selected by the human operator by means of either physically touching said picture(s) of shoe(s) or verbally issuing commands selecting said shoe(s) desired, and extending said shoe compartment(s) of the selected shoe(s), whereby said shoe compartment drawer retracts to its closed position either by the human operator closing said drawer or by the aid drawer closing automatically after a predetermine timeout period.

9. The shoe selection device of claim 8 further comprising of;

a. storage means for storing the pictures of each shoe contained within said shoe organizer unit, b. means for selecting the desired shoe(s) by means of the human either physically touching said cell(s) containing the picture of the desired shoe(s) or by the human saying predetermined commands or by the use of natural language software, indicating the desired shoe(s), c. a display unit which comprises of a touch screen display or push button display containing said picture of shoes preferably show in grid-like fashion, d. means of inputting the appropriate picture of said shoes contained within said shoe organizer unit into the desired cell location within said shoe selection device by means of a communication channel to and from a properly equipped camera and organized by the human into the desired cells via a pointing device, computer keyboard, voice commands, or by touch screen input, e. means of optionally inputting the appropriate shoe characteristics of said shoes contained within said shoe organizer by means of a pointing device, computer keyboard, voice commands, or by touch screen input.

10. The shoe selection device of claim 8 wherein the said shoe selection device communicates to said shoe organizer unit for presenting the desired shoe(s) through a plurality of data transmission methods such as but not limited to;

a. a wired data transmission protocol through one or more wires, b. a direct wire method where each individual shoe compartment in said shoe organizer unit is directly connected to said cells within said shoe selector device, c. a wireless data transmission protocol whereby the "address" of each shoe compartment within said shoe organizer unit is communicated by said shoe selector device to open and close the selected shoe compartment drawer.

11. The shoe organizer unit of claim 8 wherein the transport mechanism for extending and retracting the shoe compartment drawer comprises of a combination of devices such as a ball bearing and rail combination or a rack and pinion combination.

12. The shoe organizer unit of claim 8 wherein the mechanism for physically moving the said shoe compartment drawer comprises of a combination of devices providing a means for retracting and extending said shoe compartment drawer through the use of a reversible motor or a spring loaded compartment drawer activated electrically by said shoe selection device.

13. The shoe organizer unit of claim 8 further including a device whose purpose is to receive the transmission from the said shoe selection unit regarding the electrical representation of the selected shoe's "address" associated with the compartment drawer(s) and convert said electrical representation(s) into a physical electrical signal(s) directed to desired compartment drawer(s) containing the selected shoe(s).

14. The shoe organizer unit of claim 8 further including a means for detecting when said shoe compartment drawer is in its opened position and retracts said opened drawer either via an automatic means through a predetermined timer or through the detection of the human pushing the drawer close through the use of a detection device capable detecting the inward motion of said drawer.

* * * * *